United States Patent [19]

Spada et al.

[11] Patent Number: 4,795,019

[45] Date of Patent: Jan. 3, 1989

[54] APPARATUS FOR WITHDRAWING ROD-LIKE ARTICLES FROM A HOPPER

[75] Inventors: Valter Spada; Luigi Mangiarotti, both of Bologna, Italy

[73] Assignee: SASIB S.p.A., Bologna, Italy

[21] Appl. No.: 16,089

[22] Filed: Feb. 18, 1987

[30] Foreign Application Priority Data

Feb. 26, 1986 [IT] Italy ................ 12435 A/86

[51] Int. Cl.[4] .............. B65G 1/00; A24C 5/32; A24C 5/33
[52] U.S. Cl. .................. 198/347; 198/533; 131/282; 131/283
[58] Field of Search .......... 131/94, 282, 283; 198/347, 533, 525

[56] References Cited

U.S. PATENT DOCUMENTS

| 4,084,685 | 4/1978 | Hollenton et al. | 131/282 |
| 4,200,181 | 4/1980 | Clarke | 131/282 |
| 4,364,462 | 12/1982 | Tolasch et al. | 131/282 |
| 4,368,742 | 1/1983 | Wahle et al. | 198/347 |
| 4,420,073 | 12/1983 | Hausler et al. | 198/347 |

Primary Examiner—V. Millin
Attorney, Agent, or Firm—Spencer & Frank

[57] ABSTRACT

The present invention relates to an apparatus for withdrawing and singling rod-like articles, particularly filter plugs for cigarettes, or the like, contained in a feeding hopper. The bottom of the hopper is at least in part formed by a rotary, possibly suction, fluted drum receiving one rod-like article in each one of its flutes and carrying the thus collected rod-like articles out of the feeding hopper. The apparatus according to the invention is characterized in that within the feeding hopper an either stationary or movable, flat or arcuate guiding device is provided over the ascending sector of the fluted drum. The guiding device extends in an inclined direction, substantially tangential to drum, at a distance therefrom that corresponds to a multiple of the diameter of the rod-like articles. With the fluted drum, the guiding device forms a duct having at least one convergently shaped inlet end.

21 Claims, 3 Drawing Sheets

APPARATUS FOR WITHDRAWING ROD-LIKE ARTICLES FROM A HOPPER

BACKGROUND OF THE INVENTION

1. Field of the Invention

The present invention relates to an apparatus of withdrawing the filter plugs used in the manufacture of filter-tipped cigarettes.

2. Discussion of the Prior Art

Known apparatuses of this type have the drawback that at the desired high speeds of withdrawal by the rotation of the fluted drum, the flutes in the drum are irregularly filled, especially because of the bridges that tend to be formed in the mass of the moving rod-like articles contained in the hopper. The fact of leaving some drum flutes empty brings about some problems in the subsequent use of the rod-like articles.

The object of the invention is an apparatus for withdrawing and singling rod-like articles contained in a feeding hopper, the bottom of which is at least in part formed by a rotary, possibly suction, fluted drum receiving one rod-like article in each one of its flutes and carrying the thus collected rod-like articles out of the feeding hopper, where it generally transfers them to a successive conveyor for their further use.

The object of the present invention is to eliminate the above-described drawback, and to impart a rolling movement to the rod-like articles lying within the hopper in a zone that is adjacent to the drum and extends over a wide sector thereof. This avoids the forming of bridges, while simultaneously applying on the rod-like articles a force being substantially directed radially toward the drum, so as to promote the insection of said articles into the flutes in said drum.

To this end, according to the invention, at the inside of the feeding hopper a guiding device is provided over the ascending sector of the rotary fluted drum. The grining extends in an inclined direction substantially tangential to the drum, at a distance therefrom that corresponds to a multiple of the diameter of the rod-like articles, and with the fluted drum the guiding device forms a duct having at least one convergently shaped inlet end.

The guiding device may be, as a whole or in part, flat or arcuate, with the concave side turned toward the drum. In any case, the guiding device applies to the rod-like articles a pressure being directed radially toward the fluted drum, when the mass of moving rod-like articles penetrates in the convergently shaped inlet or inlets of the duct formed between the guiding device and the fluted drum.

The guiding device according to the invention may be an immovable device, so that it forms a stationary flat or arcuate surface on which the rod-like articles roll and the grinding device makes up the adjacent layer of the mass of rod-like articles filling the duct between the guiding device and the fluted drum. The rolling of the rod-like articles in the layer that is adjacent to the immovable guiding device, is transmitted also to the other rod-like articles which are thus kept moving, whereby the forming of bridges is avoided.

This effect of moving the rod-like articles contained in the feeding hopper, and of keeping them moving, may be further increased by imparting to the guiding device its own motion, such as, for example, an alternate oscillatory motion and/or a motion of translation in the longitudinal direction of the guiding device. Such a longitudinally translational motion may be a continuous motion in the same direction, for example, in the direction concordant with, or opposite to the rotation of the fluted drum, or, preferably, it may even be an alternate motion, and can be obtained in a particularly simple manner when the guiding device is made in the form of a band.

BRIEF DESCRIPTION OF THE DRAWINGS

These and other features of the apparatus according to the invention will appear in the claims and in the following specification of some embodiments thereof, which are diagrammatically shown by way of a non-limiting examples in the annexed drawings, in which:

DESCRIPTION OF THE PREFERRED EMBODIMENTS

Figure 1:
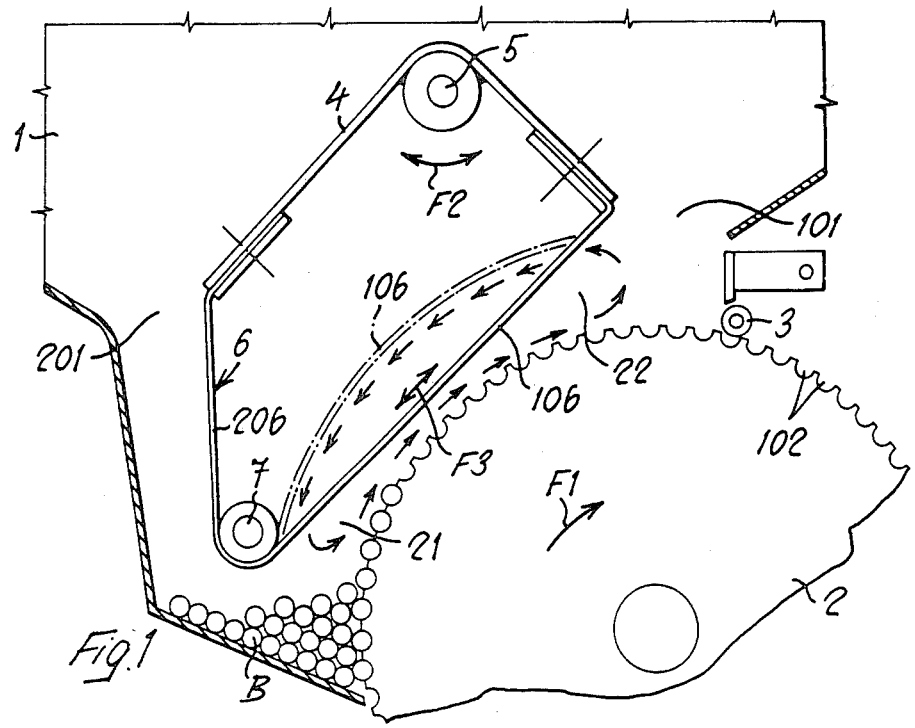
FIG. 1 is an elevational view showing a first embodiment of the present invention.

In all the figures, there is a hopper 1 for feeding filter plugs B to a filter tip-applying machine for the manufacture of filter-tipped cirgarettes. At least part of the bottom of the hopper 1 is formed by a drum 2 which is so driven as to be rotated in the direction of arrow F1. The drum 12 is peripherally provided with flutes 102 that can each contain only one filter plug B. The flutes 102 in drum 2 are preferably provided with ports (not shown) through which suction is applied at least in correspondence of the hollow of hopper 1 and over a certain distance downstream thereof. At the side from which the fluted drum 2 comes out of hopper 1, a so-called repelling roller 3 rotating in the same direction as drum 2, is arranged between the wall of the hopper and the drum 2. The repelling roller 3 has the function of pushing back the filter plugs B not contained in the flutes 102 in drum 2, and of preventing them from getting out of the hopper.

In the embodiment according to FIG. 1, at the interior of hopper 1 a tile member 4 shaped like an overturned V, is provided over the ascending sector of the fluted drum 2. The tile member 4 is secured to a shaft 5 which is imparted an alternating rotatory motion, so that the tile member 4 is caused to swing according to the double arrow F2. A guiding device of flexible material, consisting of a band 6 made, for example, of a plastic material or of a fabric, is passsed around an idle guide roller 7 and by its ends is fastened to the wings of the swingable tile member 4. At the interior of hopper 1, the guide roller 7 is arranged in such a fixed position that the band 6 presents an inclined branch 106 turned toward the drum 2, and extending over the drum in a substantially tangential direction to the ascending sector of said drum. The other branch 206 of the guiding band 6 may be substantially vertical.

The length of the guiding band 6 is greater than the strictly required development, that is to say, the band 6 is loosely led about the guide roller 7 so as to permit the swinging motion of the tile member 4. The swinging of the tile member 4 brings about a corresponding longitudinal alternate movement of the two branches 106 and 206 of band 6, particularly of the inclined branch 106, according to the double arrow F3. Moreover, because to the band 6 is loosely fitted on, its branch 106 turned toward the fluted drum 2, takes a more or less arcuate shape owing to the mass of filter plugs B normally filling the duct formed between the fluted drum 2 and the branch 106 of band 6, as shown by dash-and-dot lines. The average speed of the longitudinal alternate movement of the branch 106 of band 6 is preferably higher than the peripheral speed of drum 2.

During the operation, the tile member 4 regulates the flow of the filter plugs B toward the drum 2, through the two openings 101 and 201 formed in hopper 1 at both ends of the tile member 4. The tile member 4 also adjusts the flow to the withdrawal by the fluted drum 2. Moreover, the tile member 4 prevents the mass of filter plugs B contained in hopper 1 from applying an excessive pressure on the fluted drum 2. The band 6, particularly its inclined branch 106, defines relatively to the drum 2, a duct having two flaring ends, that is to say, two convergently shaped inlets 21,22. Through the respective convergent inlets 21,22 of the duct, the mass of filter plugs B having flown through the openings 101 and 201, penetrates between the drum 2 and the branch 106 of band 6, thus producing the bending of the branch 106. Thus, the branch 106 of band 6 applies on the filter plugs B some forces being directed radially toward the drum 2, and which help the insertion of the filter plugs into the flutes 102 of drum 2. At the same time, the longitudinal alternate movement of the branch 106 of band 6 keeps moving the mass of filter plugs B lying between the drum 2 and the branch 106 of the band 6. More particularly, the movement exerts on the filter plug mass a disengaging action that prevents the forming of bridges. More precisely, the filter plugs B that form the layer in contact with the branch 106 of band 6, are caused to roll over themselves by the longitudinally sliding movement of the branch 106 of band 6, and also entrain in rotation the other filter plugs in contact therewith. Also a circulating movement may occur in the mass of filter plugs B contained between the fluted drum 2 and the inclined branch 106 of band 6, as shown by the small arrows in FIG. 1. Anyhow, the combined action of pressing and entraining in movement (disengagement) as exerted by the inclined branch 106 of band 6 on the mass of filter plugs B, is efficient to render extremely small the probability of a flute 102 in drum 2 remaining empty, even at the highest operating speeds.

Figure 2:
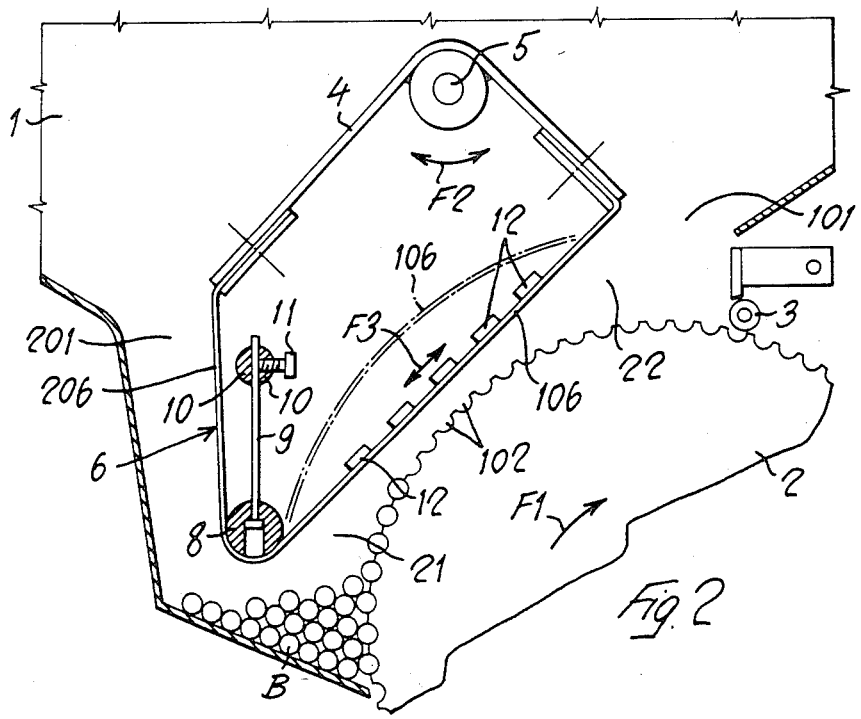
FIG. 2 is an elevational view of a second embodiment according to the present invention.

The modified embodiment according to FIG. 2 presents a similar operation, and is carried out substantially in the same way as described by referring to FIG. 1. The equivalent pieces being designated by the same reference numerals. The guiding band 6 is led about a cylindrical weight 8 that is provided in place of the guide roller 7, and is so mounted as to be vertically slidable along a fixed rod 9. The working length of said rod 9 is adjustable, and more particularly, the rod is slidably passed through a support 10 to which it can be locked in any suitable position, for example, by means of a locking screw 11. The slidable weight 8 for guiding the band 6 acts as a stretcher of the band 6.

As an alternative, or in addition to the vertically slidable guide weight 8, small weights 12 that increase the pressure exerted by the branch 106 of band 6 on the mass of filter plugs B toward the drum 2, may be applied on the inward side of this branch 106 of band 6.

Figure 3:
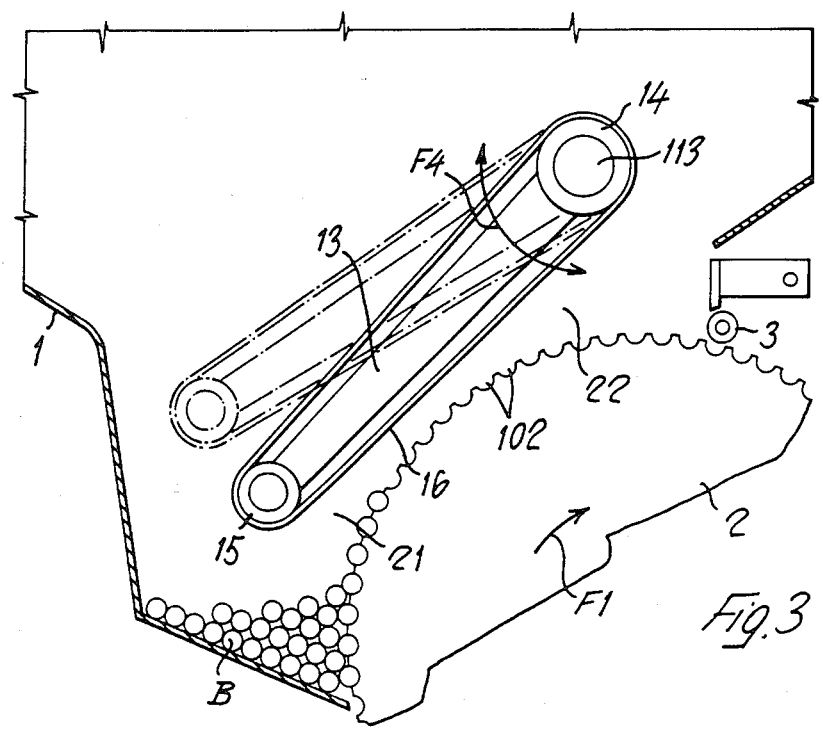
FIGS. 3 to 6 are also elevational views showing four further embodiments of the invention.

In the embodiment according to FIG. 3, at the inside of hopper 1 an arm 13 is provided over the fluted drum 2, and is included upwardly in the direction F1 of rotation of the drum 2. This arm 13 is pivotably mounted on a shaft 113 provided at the upper end of the arm 13, as shown by the double arrow F4 and by another angular position, in dash-and-dot lines, of arm 13. The arm 13 carries an endless band 16 led about an upper pulley 14 which is co-axial to the shaft 113 for the pivoting movement of the arm, and about a lower pulley 15 provided at the lower end of the arm 13. The upper pulley 14 is driven and can impart to the endless band 16 either a continuous motion, in the direction being concordant with, or discordant from the direction F1 of rotation of the fluted drum 2, or an alternate motion.

Owing to its own weight and possibly owing to additional elastic means (not shown), the assembly of arm 13 and band 16 applies a pressure being substantially directed radially, relatively to drum 2, on the mass of filter plugs B contained between the inclined lower branch of band 16 and the fluted drum 2. The possibility of arm 13 to yield upwardly by pivoting around the shaft 113 prevents any excess of pressure on the filter plugs B.

The lower branch of the endless band 16 substantially performs the same function as the inclined branch 106 of the band 6 according to FIGS. 1 and 2.

Figure 4:
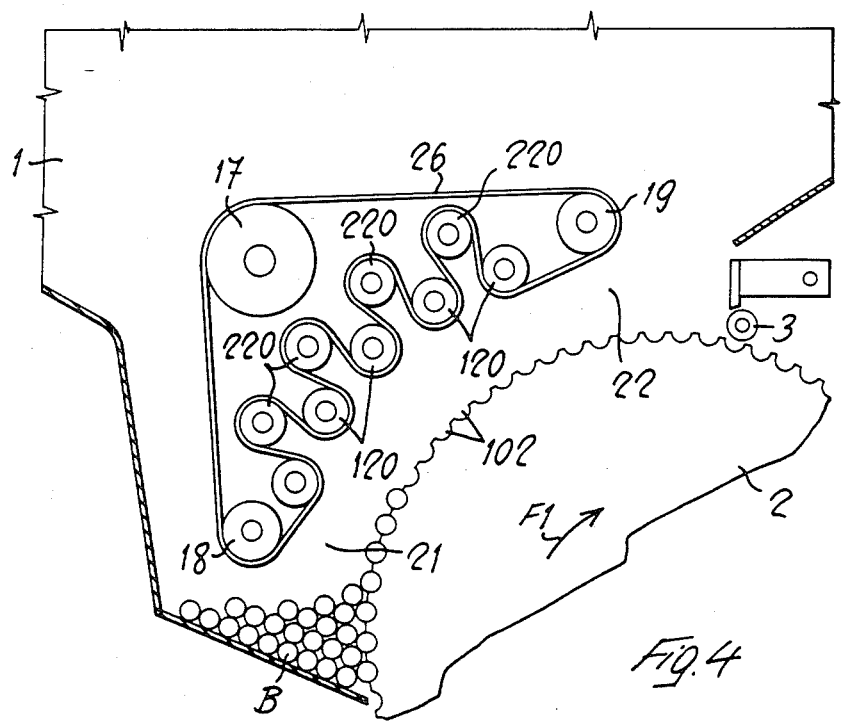

In the embodiment according to FIG. 4, an endless band 26 is led about three guide rollers 17,18,19 arranged inside the feeding hopper 1 over the fluted drum 2. Between the two guide rollers 18 and 19 lying on a straight line which is parallel to a tangent to drum 2, a plurality of guide rollers 120,220 are provided and are arranged in two offset, substantially parallel rows. The endless band 26 is passed around these guide rollers 120,220 so as to be caused to follow a tortuous path which as a whole may have a rectilinear configuration, or, as shown, an arcuate configuration, with the concave side turned toward the drum 2. All the guide rollers 17,18,19,120, and 220 are mounted in fixed positions, so that the pressure as applied on the filter plugs B in the radial direction to drum 2, essentially results from the mass of filter plugs penetrating between the drum 2 and the guiding band 26 through the convergently shaped inlets 21 and 22 of the duct formed between the drum 2 and the band 26 in the areas of the guide rollers 18,19. The loops in the tortuous path of band 26, which are open toward the drum 2, are of such a width at their openings between the guide rollers 120, that they can accommodate any excess filter plugs B, in the case of an excessive pressure being applied on the filter plugs in the radial direction to drum 2, and therefore these loops act as a sort of relief means. One of the guide rollers, for example, the roller 17, is driven, and imparts to the band 26 either a continuous motion being concordant with, or discordant from, the direction F1 of rotation of drum 2, or an alternate motion, thus promoting the desired movement of the mass of filter plugs between the drum 2 and the tortuous path section of band 26.

Figure 5:
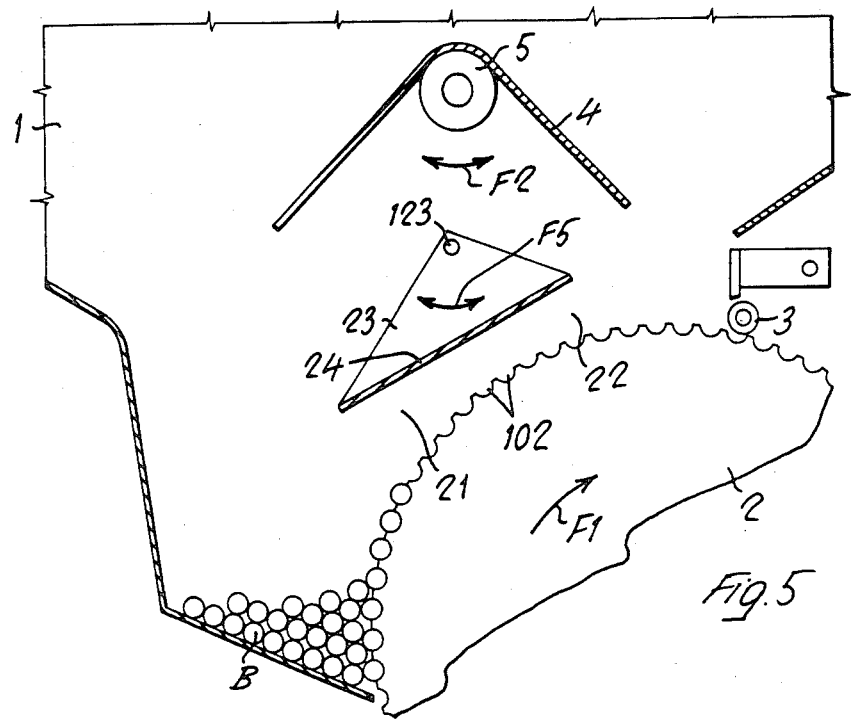

In the embodiment according to FIG. 5, over the fluted drum 2 and below a stationary or preferably swingable tile member 4 shaped like an overturned V, there is arranged a roof structure 23 having on its underside a preferably flat surface 24 that is inclined upwardly in the direction F1 of rotation of drum 2. In this embodiment, the pressure on the mass of filter plugs B in the radial direction toward the fluted drum 2, substantially results from the convergent shape of both inlets 21,22 of the duct formed between the flat surface 24 and the drum 2. The roof structure 23 and its flat lower surface 24 may then be stationary, but they may also be imparted an oscillatory motion according to the double arrow F5, around an upper pivot 123 provided, for example, at the apex of the roof structure 23. In this case, a pulsating pressure on the mass of filter plugs B contained between the oscillating flat surface 24 and drum 2, is obtained.

Figure 6:
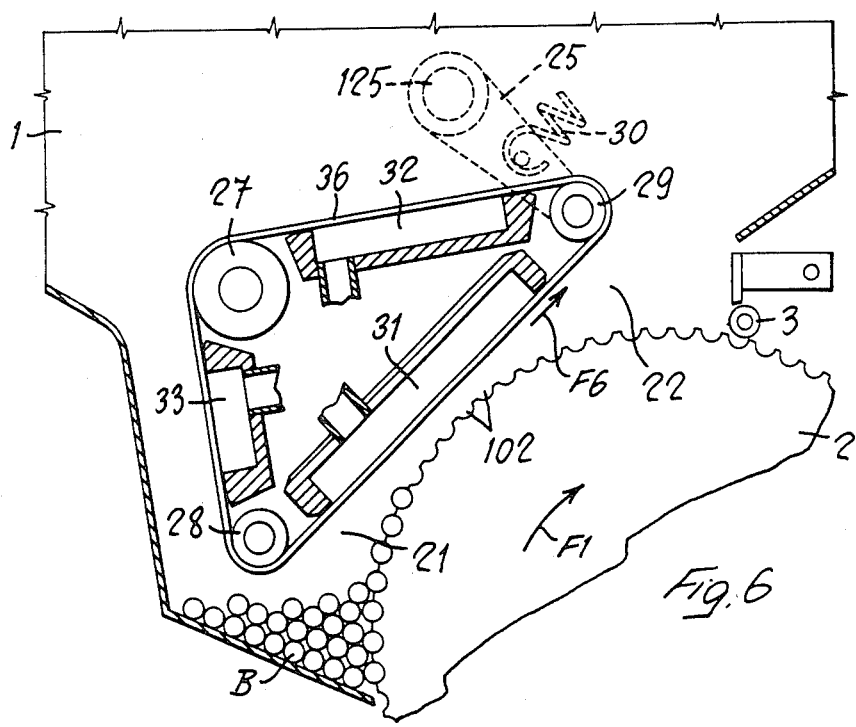

In the embodiment according to FIG. 6, an air permeable endless band 36 is provided, and is passed around three guide rollers 27,28,29. The rollers 28 and 29 are so arranged that the branch of band 36 which lies between these rollers 28 and 19, inclinedly extends over the fluted drum 2, and is parallel to a direction being tangential to the drum 2. Both rollers 27 and 28 are mounted in fixed positions, while the roller 29 has the function of a tension roller, and is carried by an arm 25 which is mounted so as to be pivotable about the shaft 125, and is urged by a pulling spring 30. At least the inclined branch of band 36, between the two rollers 28 and 29, runs on a suction box 31. One of the guide rollers, for example the roller 27, is driven, and drives the endless band 36. When only the suction box 31 is provided between the guide rollers 28,29, the motion of band 36 may be either a continuous motion in the direction being concordant with, or opposite to, the direction F1 of rotation of drum 2, or it may be an alternating motion. Suction boxes 32,33 may be however provided also or only in correspondence of the other branches of band 36, i.e., between the rollers 27,29, and 27,28, as shown in FIG. 6. In this case, the band is continuously moved in the direction being concordant with the direction F1 of rotation of drum 2, that is to say, in the direction of arrow F6. Also in the embodiment according to FIG. 6, the pressure on the filter plugs in the radial direction toward the drum 2 is applied owing to the convergent shape of both inlets 21,22 of the duct formed between the drum 2 and the branch of band 36 which is stretched between the rollers 28,29. The movement of the filter plugs B resulting from the motion of band 36, is obtained owing to the fact that through its sucking action, the band 36 takes up and drives along the layer of filter plugs adhering thereto, which in turn move and entrain the other filter plugs. In the embodiments according to FIGS. 1 to 4, the moving bands 6,16, and 26 drive along by friction the filter plugs into contact therewith and/or cause the same to roll over themselves, as previously described.

We claim:

1. An apparatus for individually withdrawing rod-like articles, comprising:
    a feeding hopper having a bottom;
    a rotary drum having a plurality of flutes, said rotary drum including an ascending portion and a descending portion, said drum being disposed in at least part of said bottom of said feeding hopper and adapted to receive one of the rod-like articles in each one of said flutes and carry the collected articles to a location disposed outside of said feeding hopper;
    a guiding device being located above the ascending portion of said rotary drum at a distance that corresponds to a multiple of the diameter of the rod-like articles, said guiding device extending in an inclined direction substantially tangential to said rotary drum, said guiding device and said rotary drum forming a duct therebetween with at least one convergently shaped inlet end; and
    means for specifically imparting an oscillatory motion to said guiding device.

2. An apparatus as defined in claim 1, wherein part of said guiding device is flat.

3. An apparatus as defined in claim 1, wherein said guiding device is arcuate shaped with the concave side facing said fluted drum.

4. An apparatus as defined in claim 1, wherein said guiding device includes a swingable roof structure having a flat lower surface.

5. An apparatus as defined in claim 1, wherein said guiding device includes a swingable guiding structure having an arcuate lower surface.

6. An apparatus for individually withdrawing single rod-like articles, comprising:
    a feeding hopper having a bottom;
    a rotary drum having a plurality of flutes, said rotary drum including an ascending portion and a descending portion, said drum being disposed in at least part of said bottom of said feeding hopper and adapted to receive one of the rod-like articles in each one of said flutes and carry the collected articles to a location disposed outside of said feeding hopper;
    a guiding device being located above the ascending portion of said rotary drum at a distance that corresponds to a multiple of the diameter of the rod-like articles, said guiding device extending in an inclined direction substantially tangential to said rotary drum, said guiding device and said rotary drum forming a duct therebetween with at least one convergently shaped inlet end; and
    means for specifically imparting a translational motion to said guiding device in its longitudinal direction.

7. An apparatus as defined in claim 6, wherein the longitudinally translational motion of said guiding device is in the general direction of rotation of said drum.

8. An apparatus as defined in claim 6, wherein the longitudinally translational motion is an alternating translational motion.

9. An apparatus for individually withdrawing single rod-like articles, comprising:
    a feeding hopper having a bottom;
    a rotary drum having a plurality of flutes, said rotary drum including an ascending portion and a descending portion, said drum being disposed in at least part of said bottom of said feeding hopper and adapted to receive one of the rod-like articles in each one of said flutes and carry the collected articles to a location disposed outside of said feeding hopper;
    a guiding device being located above the ascending portion of said rotary drum at a distance that corresponds to a multiple of the diameter of the rod-like articles, said guiding device extending in an inclined direction substantially tangential to said rotary drum, said guiding device and said rotary drum forming a duct therebetween with at least one convergently shaped inlet end, said guiding device further including
    a shaft;
    a tile member configured as an inverted V and including two wings, said tile member disposed around said shaft at the apex of said tile member; and
    a band having two ends, said band ends being fastened to said two wings of said tile member, and said band including a branch extending over said ascending portion of said rotary drum and being inclined upwardly in the direction of rotation of said rotary drum.

10. An apparatus as defined in claim 9, wherein said guiding device further comprises at least one stationary roller guiding said band.

11. An apparatus as defined in claim 9, wherein said guiding device further comprises a cylindrical weight that contacts said band and is vertically movable relative to said hopper.

12. An apparatus as defined in claim 11, wherein said guiding device further comprises a vertical rod disposed therein and means for adjusting the position of said vertical rod relative to said band, and said cylindrical weight being disposed at one end of said vertical rod.

13. An apparatus as defined in claim 9, wherein the length of said band is adapted to be deformed by the mass of rod-like articles which accumulate in said duct between said guiding device and said rotary drum.

14. An apparatus as defined in claim 9, wherein said guiding device further comprises small weights located on said band on the side opposite the side facing said rotary drum.

15. An apparatus for individually withdrawing single rod-like articles, comprising:
 a feeding hopper having a bottom;
 a rotary drum having a plurality of flutes, said rotary drum including an ascending portion and a descending portion, said drum being disposed in at least part of said bottom of said feeding hopper and adapted to receive one of the rod-like articles in each one of said flutes and carry the collected articles to a location disposed outside of said feeding hopper;
 a guiding device being located above the ascending portion of said rotary drum at a distance that corresponds to a multiple of the diameter of the rod-like articles, said guiding device extending in an inclined direction substantially tangential to said rotary drum, said guiding device extending in an inclined direction substantially tangential to said rotary drum, said guiding device and said rotary drum forming a duct therebetween with at least one convergently shaped inlet end, said guiding device further including:
 a plurality of rollers;
 an endless band disposed around said rollers and having a branch extending over said ascending portion of said rotary drum, said branch also being upwardly inclined in the direction of rotation of said rotary drum; and
 means for driving at least one of said rollers in at least one of a continuous or alternating rotary motion.

16. An apparatus as defined in claim 15, wherein said guiding device further comprises a pivotal arm contacting at least one roller and a shaft disposed inside and drivingly connected to another of said rollers; said arm being pivotal toward said rotary drum by gravity.

17. An apparatus as defined in claim 15, wherein said guiding device further comprises a pivotal arm contacting at least one roller and a shaft disposed inside and drivingly connected to said arm being pivotal toward said rotary drum by an elastic means.

18. An apparatus as defined in claim 15, wherein the inclined branch is guided by several of said rollers to cause said band to follow a tortuous path.

19. An apparatus as defined in claim 18, wherein between alternating rollers of said tortuous path there are defined openings which are open toward said rotary drum so that at least one of said rod-like articles may pass through one of said openings.

20. An apparatus as defined in claim 15, wherein said band is an air permeable band and said guiding device further comprises a suction box contacting said band at the inclined branch.

21. An apparatus for individually withdrawing rod-like articles, comprising:
 a feeding hopper having a bottom;
 a rotary drum having a plurality of flutes, said rotary drum including an ascending portion and a descending portion, said drum being disposed in at least part of said bottom of said feeding hopper and adapted to receive one of the rod-like articles in each one of said flutes and carry the collected articles to a location disposed outside of said feeding hopper;
 a guiding device being located above the ascending portion of said rotary drum at a distance that corresponds to a multiple of the diameter of the rod-like articles, said guiding device and said rotary drum, forming a duct therebetween with at least one convergently shaped inlet end, wherein the average speed at said guiding device is greater than the peripheral speed of said rotary drum.

* * * * *